No. 880,816. PATENTED MAR. 3, 1908.
J. NULL.
BELT TIGHTENER.
APPLICATION FILED DEC. 12, 1907.
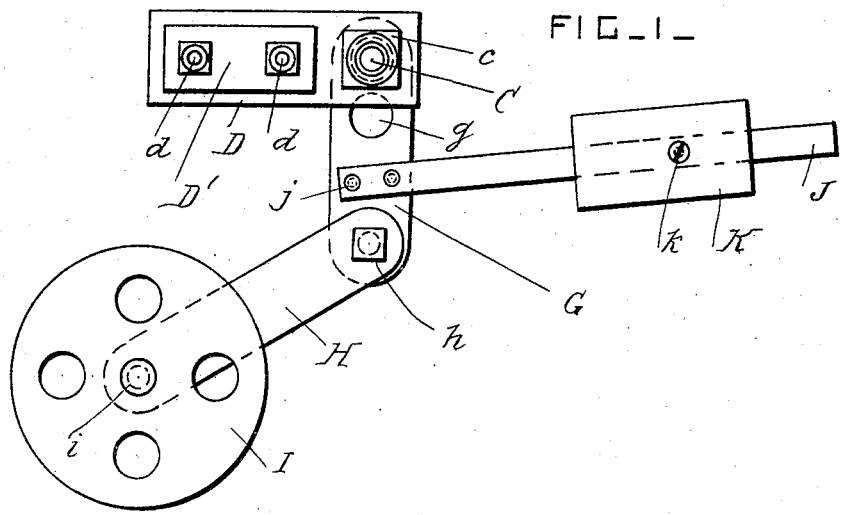
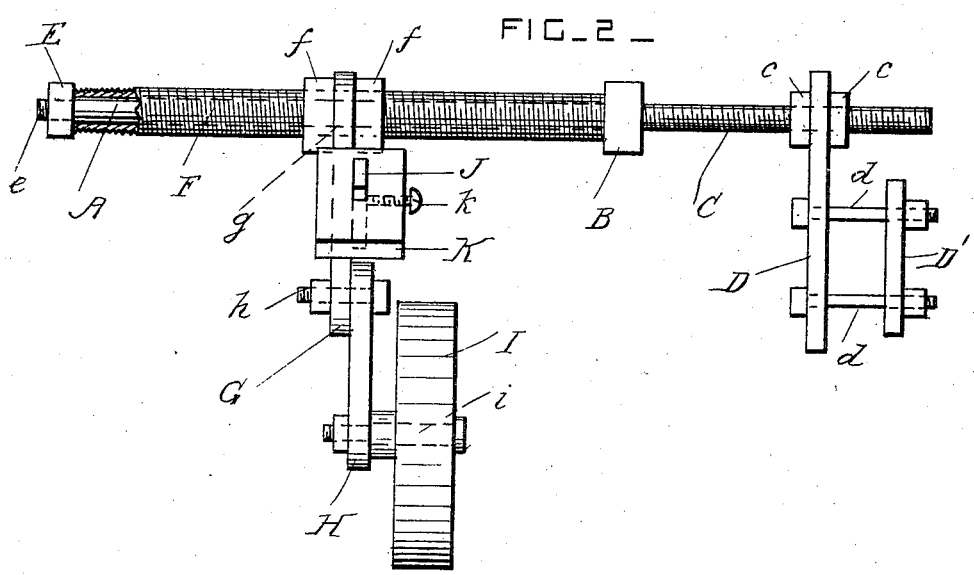
WITNESSES:
INVENTOR
Jesse Null
BY
Hubert W. Jenner.
Attorney

UNITED STATES PATENT OFFICE.

JESSE NULL, OF EVANSTON, ILLINOIS.

BELT-TIGHTENER.

No. 880,816.  Specification of Letters Patent.  Patented March 3, 1908.

Application filed December 12, 1907. Serial No. 406,151.

*To all whom it may concern:*

Be it known that I, JESSE NULL, a citizen of the United States, residing at Evanston, in the county of Cook and State of Illinois, have invented certain new and useful Improvements in Belt-Tighteners; and I do hereby declare the following to be a full, clear, and exact description of the invention, such as will enable others skilled in the art to which it appertains to make and use the same.

This invention relates to mechanism for automatically tightening the driving-belts or chains used on automobiles and other similar machines; and it consists in the novel construction and combination of the parts hereinafter fully described and claimed.

In the drawings, Figure 1 is a front view of the belt tightener. Fig. 2 is a side view of the belt tightener, showing a portion of the pivot sleeve in section.

A is a supporting-spindle provided with a collar B at its middle part.

C is a screwthreaded portion on one side of the collar B, and D is one arm of a clamp which is adjustable longitudinally on the part C. The arm D is held in position by two nuts $c$ which engage with the screwthreaded portion C. D' is the other arm of the clamp, and $d$ are the clamping-bolts which engage with holes in the said arms. This clamp is used to secure the supporting-spindle to any convenient portion of the frame of an automobile or other machine provided with a driving-belt or chain, and this clamp can be adjusted to any position circumferentially of the spindle as well as longitudinally of it.

E is a retaining-nut screwed on a projection $e$ on the other end of the spindle from the clamp.

F is an externally screwthreaded pivot-sleeve which is journaled on the spindle A between the collar and the retaining-nut.

G is an arm provided with a plurality of holes $g$ for engaging with the sleeve F, and $f$ are two nuts for securing the said arm in any desired position longitudinally of the said sleeve. The holes $g$ are arranged at different parts of the length of the arm G so that the leverage of the said arm can be varied.

H is an arm which is secured at one end to one end portion of the arm G by means of a clamping-bolt $h$ which permits the arm H to be set at any desired angle with respect to the arm G, or it may be arranged in line with it.

I is a tightener sheave journaled on a pin $i$ secured to the free end portion of the jointed arm comprised by the portions G and H.

J is a laterally projecting arm secured to the middle part of the arm G by rivets or bolts $j$, and K is a weight which is adjustable on the arm J. A set-screw $k$ is provided for holding the said weight in position on the arm J after its position has been adjusted. The use of a weight is preferred in carrying out this invention, but its mechanical equivalent in any approved form of spring can also be used.

The sheave is caused to bear against the driving-belt or chain, and is pressed upon it so as to tighten it automatically by means of the jointed arm and weight.

What I claim is:

1. In a belt-tightener, the combination, with a supporting-spindle and means for securing it in position, of a pivot-sleeve journaled on the said spindle, an arm adjustable longitudinally on the said sleeve, a tightener-sheave supported by the said arm, and operating mechanism for moving the said arm and sheave pivotally.

2. In a belt tightener, the combination, with a supporting-spindle and means for securing it in position, of a pivot-sleeve journaled on the said spindle, a jointed arm, means for securing its members together at different angles, means for securing one of the said members to the said sleeve at any desired point longitudinally, a tightener-sheave supported by the other member, and operating mechanism for moving the jointed arm and sheave pivotally.

3. In a belt-tightener, the combination, with a supporting-spindle, of a clamp adjustable longitudinally and circumferentially upon one end portion of the said spindle, a pivot-sleeve journaled on the other end portion of the said spindle, an arm adjustable longitudinally on the said sleeve, a tightener-sheave supported by the said arm, and operating mechanism for moving the said arm and sheave pivotally.

4. In a belt-tightener, the combination, with a supporting-spindle and means for securing it in position, of a pivot-sleeve journaled on the said spindle, a jointed arm, means for securing its members together at different angles, one of the said members having a plurality of holes for engaging with the said sleeve, means for securing the said member to the said sleeve at any desired point longitudinally, a tightener-sheave supported by the other member of the said jointed arm, and operating mechanism for moving the said jointed arm and sheave pivotally.

In testimony whereof I have affixed my signature in the presence of two witnesses.

JESSE NULL.

Witnesses:
    PRATT UNDERWOOD,
    WALTER A. HANSEN.